United States Patent

Hestad et al.

[15] 3,660,610

[45] May 2, 1972

[54] CONFERENCE CALL CIRCUIT

[72] Inventors: Alfred M. Hestad, Chicago; Stanley E. White, Crestwood, both of Ill.

[73] Assignee: International Telephone and Telegraph Corporation

[22] Filed: Apr. 24, 1970

[21] Appl. No.: 31,641

[52] U.S. Cl. ........................................................ 179/18 BC
[51] Int. Cl. ........................................................ H04m 3/56
[58] Field of Search ............................................ 179/18 BC

[56] References Cited

UNITED STATES PATENTS

| | | | |
|---|---|---|---|
| 3,258,539 | 6/1966 | Mansuetto et al. | 179/18 J |
| 3,441,678 | 4/1969 | Budlong et al. | 179/18 BC |
| 3,527,889 | 9/1970 | Nennerfelt | 179/18 BC X |
| 3,231,678 | 1/1966 | Ward et al. | 179/18 BC |

*Primary Examiner*—Kathleen H. Claffy
*Assistant Examiner*—Thomas W. Brown
*Attorney*—C. Cornell Remsen, Jr., Walter J. Baum, Paul W. Hemminger, Charles L. Johnson, Jr., James B. Raden, Delbert P. Warner and Marvin M. Chaban

[57] ABSTRACT

A conference call circuit for a system having a crosspoint switching network of the end-marking type. The circuit allows a private conversation to be held between the calling station and a called station in a "progressive" conference through the use of a voice gate within a conference access circuit individual to the calling and called stations. When the private conversation is to be terminated, the voice gates are switched by a signal such as the flashing of a hook switch. Meet-me conferences and attendant switched conferences are also possible.

7 Claims, 5 Drawing Figures

INVENTOR
ALFRED M. HESTAD
STANLEY E. WHITE
BY
[signature]
ATTORNEY

CONFERENCE CALL CIRCUIT

This invention relates to telephone systems having conference call facilities and more particularly to electronic switching telephone systems having the ability to complete conference calls on either a "progressive" or a "meet-me" basis, together with facilities for holding either a private or an all parties conversation.

Reference is made to U.S. Pat. No. 3,204,044, entitled "Electronic Switching Telephone System," granted Aug. 31, 1965, to V. E. Porter and assigned to the assignee of this invention. This patent shows an electronic switching telephone system using PNPN diode crosspoints and including principles and features which are used in this invention. Other U.S. Pat. Nos. (3,258,539 and 3,324,248) granted June 28, 1966 and June 6, 1967 to Mansuetto et al., and Seemann et al., respectively, and assigned to the assignee of this invention, show a similar system having common controls and signal busses for giving class of service restrictions. Still other U.S. patents assigned to the assignee of this invention show additional features which may be used in the subject type of switching systems.

Conference call circuits provide facilities whereby a suitable number of telephone stations may be connected together in a common conversation path. Among other things, the conference call circuit cancels or masks the busy markings which would otherwise prevent access by all except the first called subscriber. In addition, the circuit may provide amplification, where required, which is usually when more than five subscribers are connected together.

In general, there are two types of conference calls. One is a "meet-me" conference, which requires the subscriber convening the conference call to first telephone each participant and ask him to dial a special conference call number at an appointed time. All prospective participants do so by placing new calls, and the conference circuit connects all of their telephones together in a single voice transmission circuit. The second or "progressive" type of conference call requires the convening subscriber to first dial a prefix number. This gives him access to the conference circuit, and then he dials in sequence the directory numbers of each subscriber who will participate in the conference call. As each subscriber answers, his telephone set is usually connected into the voice circuit of the conference call. The progressive call does not generally allow the convening party to speak privately with any of the participants at the time when their telephones are connected into the conference call. If he wishes to have such a private conversation, he must do so before initiating the conference call.

Accordingly, an object of this invention is to provide new and improved conference call facilities. More particularly, an object is to provide a circuit which may function as either a "-meet-me" or a "progressive" conference call circuit. Here, an object is to provide facilities for enabling a private conversation between the convening party and the participants, regardless of the type of conference call that is set up.

Another object of the invention is to provide conference call facilities for the Porter type of electronic switching telephone systems. Here, an object is to provide conference call circuits which may be enabled or inhibited according to the class of service given to the convening party. Stated another way, an object is to preclude use of the conference call facilities by unauthorized persons. Another object is to enable conference calls by using only conventional control techniques, such as a hook switch flash, for example, thereby requiring a minimum amount of special subscriber training in the use of the conference call facilities.

In keeping with an aspect of the invention, these and other objects are accomplished by a common conference call circuit having a plurality of access circuit means (herein called "-ports"). Each port has separately contained voice gates for switching the conferenced subscriber's telephone sets between either of two mixing busses. One bus is used for carrying on a private conversation between two parties who may be connected thereto at any given instant. The other bus is used for carrying on a common conversation between all conferenced parties except for those who are connected to the private bus. When the convening party first places a call to each participant, he and the newly called participant are connected together through a voice gate in each of the port circuits which are dedicated to those two parties. These voice gates have access to the private conversation mixing bus. Then, at the jiggle of a hook switch, the voice gates reoperate in a manner such that both parties are connected to the all parties mixing bus.

The above mentioned and other objects of this invention and the manner of obtaining them will become more apparent, and the invention itself will be best understood by reference to the following description of an embodiment of the invention taken in conjunction with the accompanying drawings, in which:

FIGS. 1a and 1b connected as shown in FIG. 1, comprise a block diagram of an electronic switching system (of the type shown in the above cited patents) with added conferencing facilities which incorporate the principles of the invention;

Figures 1, 1B, 2:
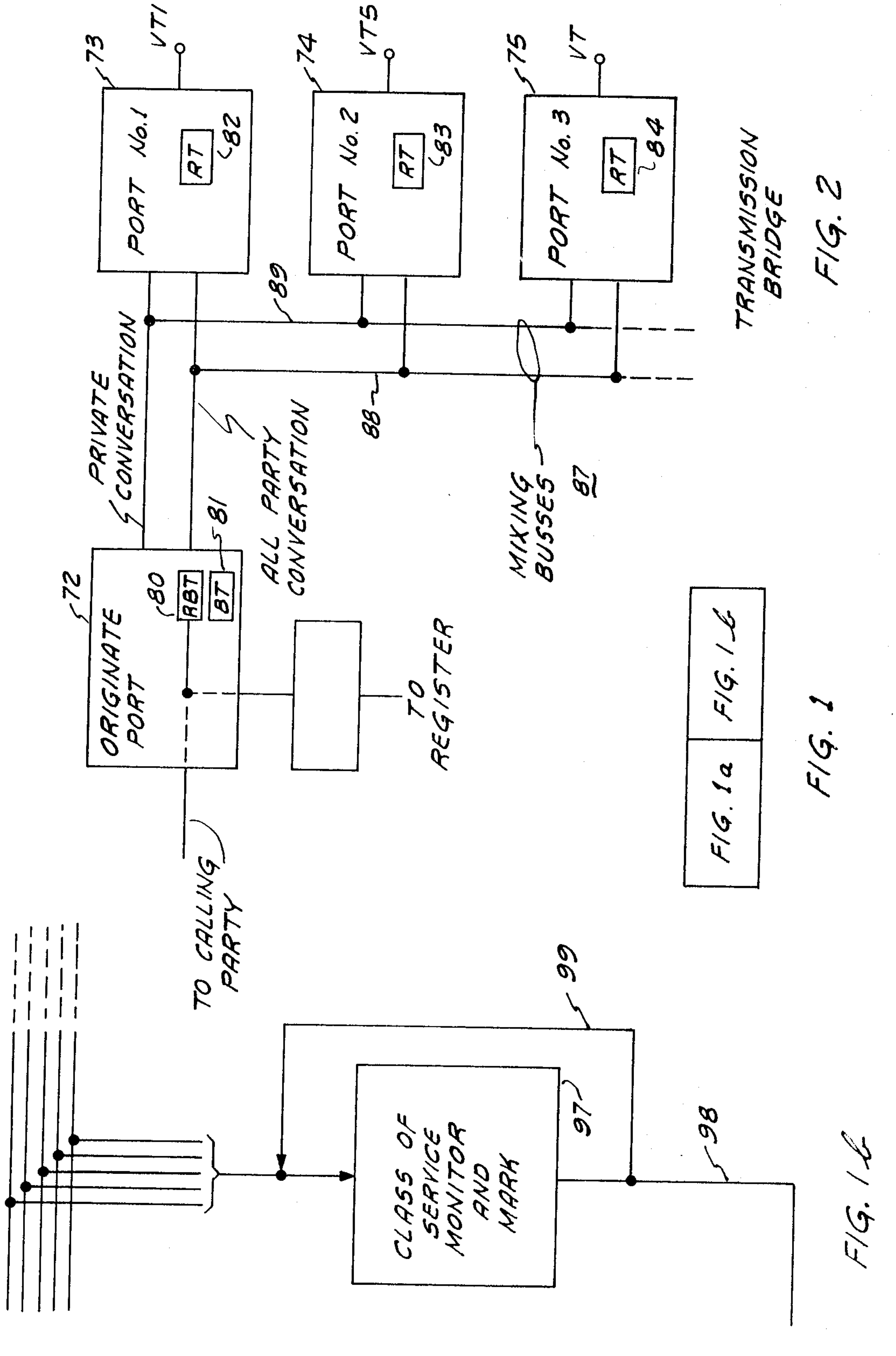
FIG. 2 is a block diagram of the conferencing facilities.
Figure 1A:
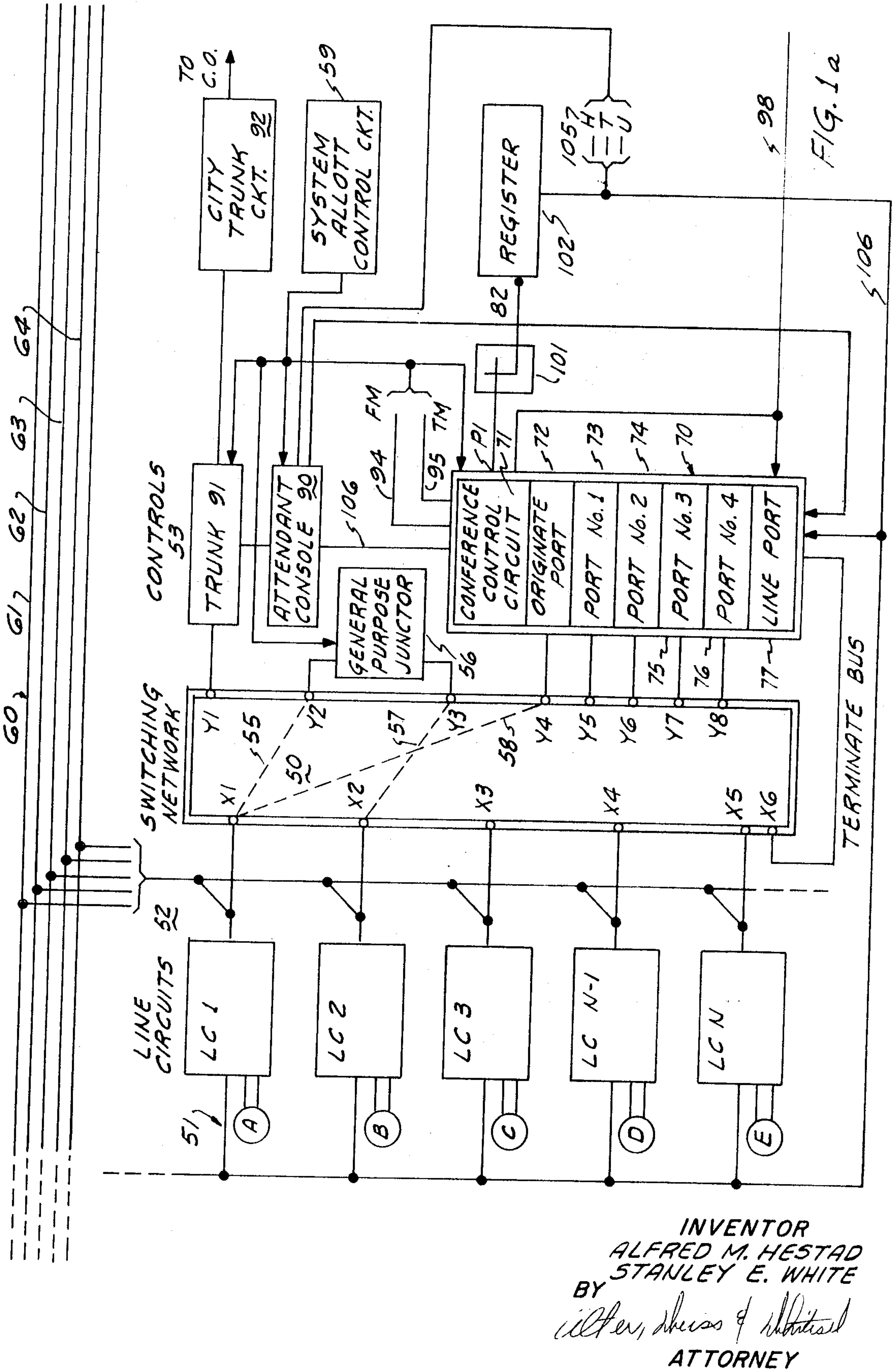

FIG. 1 shows a telephone system utilizing an end marked current controlled network 50 having PNPN diodes, or the equivalent as crosspoints. The details concerning the construction and operation of this network are shown in the above identified patents. Subscriber lines 51 are connected to one side of the network 50 via line circuits 52, and control equipments 53 are connected to the other side of the network. In general, the line circuits place a demand for service by applying an end-marking potential at an individually associated point marked "X" on the line side of the network. Control and common equipments, assigned to serve each call, place another end-marking at an individually associated point marked "Y" on the control side of the network. Responsive to these two end markings, a self-seeking path finds its own, unguided way from one end-marking over randomly selected crosspoints to the other end-marking, as over the dot-dashed line 55, for example.

The circuit operates this way. At any given time, a system allotter 59 marks a particular general purpose junctor 56 as the circuit which is assigned to serve the next call. The assigned junctor 56 stands marking the point Y2; no other junctor is allotted at this instant — no other Y end-marking can be applied to the right-hand side of the network 50.

Assuming that a calling subscriber at station A removes a receiver or hand set to place a call at the described instant, an end-marking appears at point X1 as a request for service. The potential difference between the end-markings appearing at the points X1, Y2 causes the self-seeking path 55 to find its way through the network 50. The path can extend to no place except point Y2, since there are no other Y markings. If several X markings are present, several paths may be allowed to race for the same Y2 marking. Or, an individual X point may be enabled. Either way, it is virtually certain that only one path will reach the marked point Y2 first. The first completed path eliminates the potential difference between the X and Y end-markings. Therefore, current cannot flow over the uncompleted paths, and the PNPN diodes in those paths must starve and wait for a chance to race to the next Y marking which will appear when the allotter 59 allots the next idle junctor.

After the calling subscriber dials a wanted number, a register causes the called line B to place an end-marking at point X2, and the control circuit 56 end-marks the point Y3. Then, another self-seeking path 57 finds its way from point X2 through the network 50 to point Y3. The control circuit 56 now interconnects the points Y2, and Y3 to complete a talking path from the calling line A to the called line B.

To provide special features, common signal busses are selectively marked during an allotter time frame which identifies a particular circuit involved in a particular call. Because of the time frame, all system equipments are momentarily individualized to the particular circuit serving this particular call. In this manner the system can be made extremely flexible.

By selectively marking certain ones of many common busses according to the desired services, the junctor 56 may be made to drop its connection 55 through the network 50. The potential at point X1 moves back toward the end marking potential because the network path is then open. Whenever the line side access point returns to or near this end-marking potential, a marking appears at point X1. If there is then an end-mark at a point Y of a particular feature circuit a new path 58 fires through the network 50. Since all of these path switching functions occur at electronic speeds, the subscribers do not realize when the paths over which they are talking are connected or disconnected and reconnected.

Many common class of service busses 60 are provided for identifying the subscribers who are entitled to receive the various classes of service. For example, bus 61 here indicates a need for public address equipment, bus 62 indicates executive right-of-way, bus 63 indicates any other miscellaneous service, and bus 64 indicates a right to set up a conference call. It may also be well to recall that the point X1 inherently returns to the end-marking potential whenever the associated path through the network 50 is dropped. Thus, if such a path is dropped at a time when a demand for conference service appears elsewhere in the system, the return of the end-marking appears on bus 64 if the line A is entitled to gain such service.

The construction and operation of the system described thus far is somewhat typical of all end-marked networks of the described type. The invention is primarily concerned with the various conference call control circuits, shown on the right-hand side of the network 50. In particular, the invention is concerned with the equipment shown in the rectangle 70 and in FIGS. 2 and 3. This equipment is identified in the various drawings by the same reference numerals; therefore, it may be convenient to refer to each of these drawings interchangeably throughout a reading of the following specification.

The major portions of the circuit 70 are a common conference control circuit 71, an originate port 72 for serving the convening party, four individual conference ports 73–76 for serving the participating parties, and a line port 77 for serving a trunk line. The ports 72–76 are connected to individual end points (marked Y in the drawing) on the control side of the network 50. Thus, any line may gain access to the ports 73–76 in the same manner as any line gains access to the link circuit 56. Since the port 77 has an appearance at point X6 on the line side of the network, the conference control circuit may also place any kind of a call that a line can place.

Each of the ports 73–76 gives access to the switching network 50 and provides the functions normally provided by the general purpose junctor circuit 56. These functions are to detect calls, to supply holding current, to monitor the duration of a call, and to release the connection when a call is complete.

The originate port 72 (FIG. 2) is the one which is seized first; therefore, it is the port which is always seized for the benefit of the convening party. This port 72 contains a source 80 of ringback tone and a source 81 of busy tone. These tones are returned to the calling party, but they are not forwarded to the other parties. Hence, these tones are heard only by the convening party. The other ports 73–76 are used to forward or receive calls to the conference participants, who are to be connected into the conference circuits. Each of these ports contain a source 82–84 of a ring tone which is used to signal the individual participants, as they are individually called into the conference.

Each of the port circuits 72–77 is interconnected by conversation channels, shown here (FIGS. 2,3) in the form of mixing busses 87. One of these mixing busses 88 is used for conducting a private conversation between the convening party and any one of the participating parties. All parties can hear and speak to each other via the all parties mixing bus 89.

The nature and function of the remaining circuits should become more apparent from the following description of how various conference calls may be established.

"Meet-Me" Conference: When a convening subscriber wishes to hold a "Meet-Me" conference, he first dials the directory numbers of the other parties and individually asks each of them to dial the conference feature number at a particular time. Then, at the appointed time, each of these parties so dials and gains access to the five conference port circuits (i.e., to the access points Y4–Y8.) All parties are then communicatively connected together via a voice transmission bridge including the mixing busses 87.

More particularly, after having agreed with other conference participants to an earlier request for the establishment of such a call, each subscriber may dial a predetermined directory number to gain access to the circuit 70 for setting up a "Meet-Me" type conference call. Also, as each participant places such a "Meet-Me" type call, a class of service mark describing that calling subscriber appears on the bus 64 and sets a flip-flop in the class of service circuit 97. This flip-flop stores a memory of the fact that an authorized conference call is being placed during a particular time slot which identifies the call. Responsive thereto, an enabling signal identifying the authorized class of service is sent over the wire 98 to the conference circuit 70.

Upon reflection, it should be apparent that it is not possible for a subscriber to defeat his class of service by a misuse of the conference call facilities. Still, it is possible to make any kind of a call which any participant may make. For example, it would not be possible to dial a conference call enabling number and thereafter illegally use the line port 77 to dial a long distance number with the intent of defrauding the owner of the conference number. On the other hand, if the participants in the conference call subscribe to a class of service which allows them to mark the busses 60 for a long distance call, for example, this same class of service marking returns via wires 99 to the busses 60 each time that a new connection is made into the conference call circuit 70. If they do not have such a class of service marking, the long distance enabling marking does not reappear on the busses 60, and such a call is not possible.

An alternative form of "Meet-Me" marking enables the class of service for a particular participant to control. This way, a person convening the call arranges to be the first to connect into the conference circuit 70, and his class of service marking is in control.

Progressive Call: The equipment also allows the convening party to progressively established a conference call by calling each participant in succession at the time when the call is being convened. In greater detail, when a subscriber wishes to hold such a conference, he first dials the prefix or access code prescribed for the conference circuit. This code establishes a connection 58 through the matrix 50 to the originate port 72 point of access Y4.

The calling line is checked for its class of service, and the resulting information is stored at 97 for the remainder of the conference call. Among other things, this class of service information indicates whether the calling line can cause a trunk to be connected to the conference circuit. Also, the class of service information may be used to prevent the originator from dialing any restricted codes (such as direct distant dialing area codes).

Means are provided for storing a memory of the class of service of the convening party to the conference call. More particularly, during each appropriate allotter time slot identifying a conference call, the circuit 97 feeds back a signal to the busses 60 via the wire 99. Hence, the class of service busses 60 are always marked with the class of service granted to the original subscriber each time that the system reaches a state wherein another conference connection may be made. If the convening party is not entitled to make a certain type of call, is not entitled to make a certain type of call, the conference call circuit will not be entitled to make it either. Or if the convening subscriber is entitled to make a call, the conference call circuit may also make it.

When the path 58 reaches the point Y4, the originate port 72 causes circuit 71 to operate an access switch 101 (which may be any form of switching device) and connect the conference control circuit to the register 102. The convening subscriber receives dial tone, and then (one at a time) he dials the directory numbers assigned to the other participating parties. The system operates in the conventional manner to connect each designated participant to one of the port circuits 73–76. The convening party who originates the conference call may first converse individually and privately with each participating party. Thereafter, at a flip of a hook switch, the convening party transfers the participant into an all parties conference circuit utilizing the mixing bus 89. Thereafter, the register 102 can be reconnected to the conference circuit by another hook-switch signal, unless one of the following conditions exists: (a) An extension is being rung via one of the local ports; (b) There is a busy condition; or (c) The transfer of the party previously connected to the conference circuit has not yet been completed to the "all party conference bridge." After the hook-switch signal reconnects the register to the convening circuit, subscriber's dial tone is returned. The convening subscriber then dials for storing the directory number of the next participant. The switching process is repeated, and the next party is brought into the conference. This process may be repeated any number of times until all conferees (here a total of five lines) are switched onto the all party conference bridge.

If a busy condition is encountered, busy tone is returned to the convening party. Responsive thereto, the convening party flashes his hook-switch momentarily to cause a busy tone flip-flop to be reset, and a busy tone gate is switched off. The convening party is released, and he may set up the next call.

If a called participant does not answer, the call may be released, as to that party, when the convening party flashes his hook-switch for a period which is longer than 250 milliseconds, but less than 1.5 seconds.

The convenor may access a trunk circuit or a tie line circuit (not shown) via the conference circuit 70, unless he is restricted from doing so by a class of service marking. To insert such a trunk circuit, the convenor must first gain access to the register 102, via the conference circuit 70. Then, he dials the access number of the trunk (for example, he dials "9"). Next, the convenor receives a dial tone from a distant office, and then he dials the number of the wanted line. The connection is completed in the distant office in any well known manner. When the distant subscriber station answers, the convenor may converse with the called party over a private path and without the other parties in the conference overhearing. He must wait at least ten seconds after completing his dialing before he is able to transfer the trunk circuit 92 to the all party mixing bus. As with local calls, the transfer to the conference bridge is made responsive to a hook-switch signal.

If the distant station is busy, the trunk circuit may be released by a simple hook-switch signal. However, after the trunk is once connected to the all parties mixing bus, it is no longer possible to make such a simple release since the convenor's station is no longer individually connected to the trunk. Therefore, in order to release the trunk after transfer to this mixing bus, the convenor must first operate his hook switch. This gives him access to the register via the conference circuit. After the register is connected, the convenor receives dial tone and he dials the release code. That is, he dials the access code of the Conference circuit. The register 102 simultaneously marks the point P1 on the conference circuit and the busses 106 to cause release of the line port.

Attendant Controlled Conference Call: If local subscribers are restricted from accessing the conference circuit by class of service markings on busses 60, they may be connected to the conference circuit 70 from the attendant console 90. Or, alternatively, the convening party who wishes to hold the conference may dial the directory number of the attendant console 90 and request that she set up a conference call. Either way, the attendant at console 90 must then call each party individually by dialing their directory numbers to cause their telephone sets to be connected (one at a time) to the attendant's trunk circuit 91. After each such connection, the attendant transfers the party to the appropriate one of the conference port circuits 72–76. The attendant may also connect a trunk line to a distant office into the conference circuit. By way of example, this trunk is here designated as a city trunk 92.

In greater detail, when the attendant at console 90 answers a call for a conference circuit, she does so by operating an attendant's trunk key (not shown). Then, she presses a conference key (also not shown), thereby causing the extension originating the call to be transferred from trunk 91 to the conference circuit 70. When the conference key is depressed, the attendant's control circuit 90 applies a terminate mark to network 50 through the Port No. 1 (point Y5). At the time when the terminate mark appears at point Y5, the connection between the calling line and the attendant's trunk 91 is dropped. This enables the line to be switched through the matrix to the conference circuit 70. Thereafter, the attendant calls and inserts other conferenced parties in a similar manner.

If a subscriber in a distant office wishes to hold a local conference call, the conference call is initially set up to the attendant console 90 via the trunk circuit 91. Before the attendant may connect a trunk to the conference, there must be at least one other subscriber already connected thereto. In order to connect the trunk 91 to the conference circuit, the attendant keys the number assigned for the conference circuit 70. Then she operates her console keys and her identifying busses 105 to be marked during a time slot designated for the attendants control.

The matrix 50 receives an end-marking potential at point X6 and point Y1 during the designated time slot. After 0.9 milliseconds these end-markings disappear. If the line port has successfully switched through the matrix, current flows between points X6 and Y1 to hold the path. A speech gate is activated in the line port circuit 77, with the above described results. The trunk 91 is released either responsive to an actuation of a release key at the attendant console 90; or, the trunk 91 may also be released automatically if all of the parties in the conference return their telephone sets to an on-hook condition.

Figure 3:
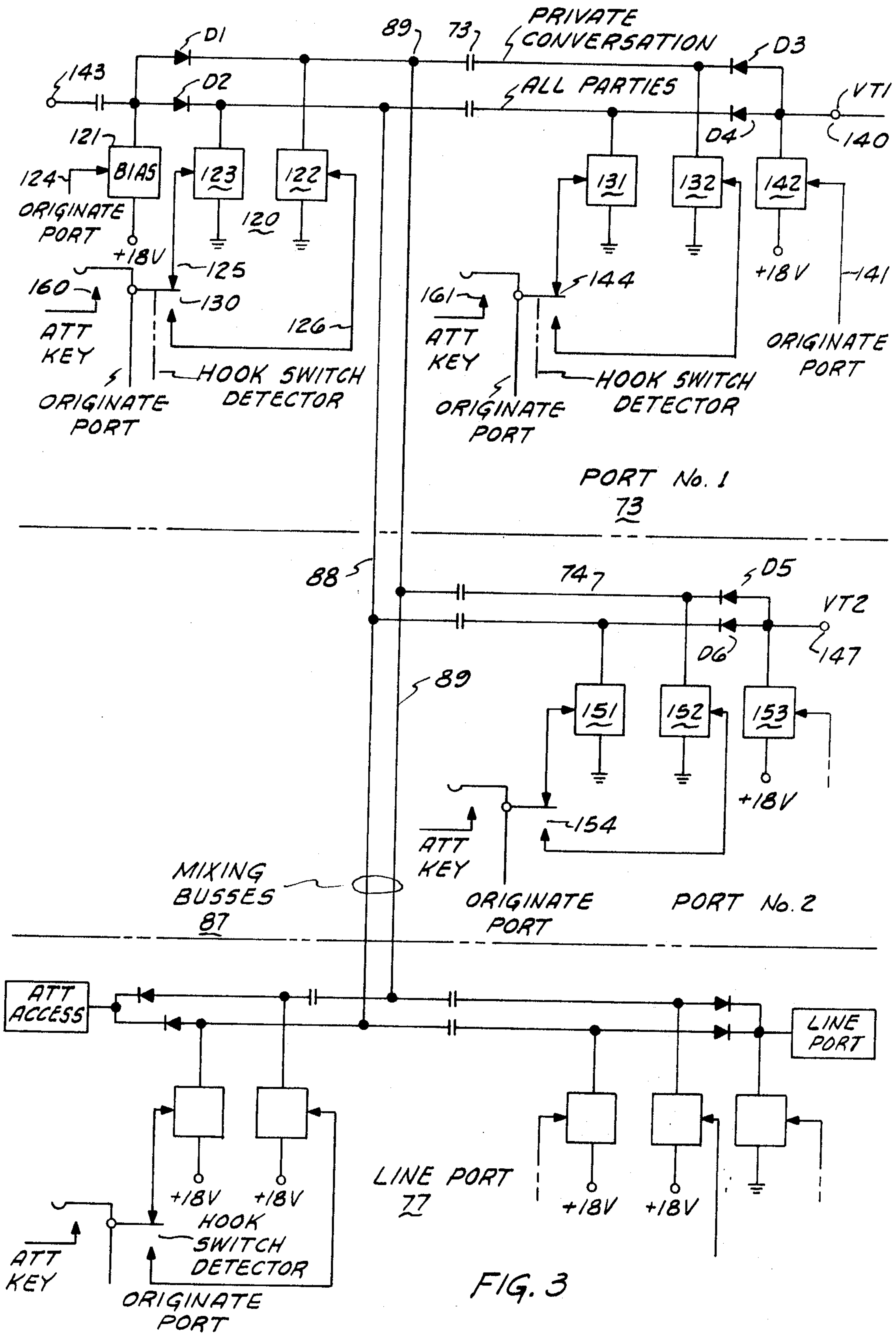
FIG. 3 is a schematic representation of the circuitry for inclusion in the blocks of FIG. 2.

Voice Gate Operations: The foregoing description explains how various call functions may be performed through a use of controls in the conference circuit 70. This circuit includes a number of port circuits 72–77, each having separate voice gates which switch on or off to provide private or conference transmission. An example of such a voice gate is seen at 120 (FIG. 3)

Each voice gate is similar to gate 120 which includes a pair of parallel connected diodes D1, and D2, having two bias circuits 121, 122 connected to opposite sides of the diode D1, and two bias circuits 121, 123 connected to opposite sides of the diode D2. Controls for these bias circuits are indicated by wires and switches at 124–126. Although schematically shown by this as simple arrangement, it should be understood that these are electronic switching devices and logic circuits.

The bias circuits are operated via these controls 124–126. Either the diodes are back biased; or, if the bias circuits are switched to an opposite polarity, the diodes are forwardly biased. The drawing symbolically shows that the polarity reversing means is a switch 130 controlled by hook-switch flashes. In a first or original condition, the switch 130 is in a position, as shown, to enable bias circuit 122 and the diode D1. At this time, the bias circuit 123 reverse bias or disable the diode D2. There are similar bias circuits 131, 132, 142 for the diodes D3, D4.

As here shown, the convening party is connected at terminal 143 and the first conference participant is connected at terminal 140. Then, the originate port circuit operates via wire 124 to enable the bias circuits 121 and, via wire 126, to enable the circuit 122. The circuits 121 and 122 apply forward bias potentials to, or remove back bias potentials from, the diode D1. There is a similar operation for forwardly biasing diode D3. Therefore, the conference convening party (accessible via terminal 43) has a private conversation path enabled over the private mixing bus 89 including diodes D1 and D3 to the called party (accessible via terminal 140).

After the private conversation is complete, the convening party momentarily jiggles a hook-switch to operate the detectors 130,144. This hook-switch detector may be a simple timer to measure the open loop interval and thereby distinguish between dial pulses and on-hook signals. Thus, these hook-switch detectors reject dial pulses as too short and disconnect signals as too long.

Responsive to the detection of a hook-switch flash, switches 130, 144 change positions. Bias circuits 122, 132 switch states to back bias the diodes D1, D3, and bias circuits 123, 131 switch states so that the diodes D2, D4 are forwardly biased. Thereafter, neither party can talk over the private mixing bus 89 and both parties may converse over the all-parties bus 88.

The convening party may now hang up while the first participant holds the conference call circuit. The hook switch detector 130 returns to normal, while the originate port circuit holds the detector 144 off normal. Then, the convening party places a new call, and the second participant is connected to the terminal point 147. This time the bias circuits 121–123 and 151–153 cooperate to forwardly bias the diodes D1, D5 and the back bias diodes D2, D6. Therefore, the convening party and the second participant may carry on a private conversation via a path including diode D1, mixing bus 89, and diode D5. Next, the convening party operates his hook-switch and causes switches 130, 154 to change their state. Responsive thereto, the bias circuits 121–123, and 151–152 change their states. The diodes D1, D5 are back biased. All three parties may now talk to each other via diodes D2, D4, D6 and the all parties mixing bus 88.

Thereafter, the convening subscriber may again hang up. The originate port holds the hook-switch detector 154 while the detector 130 returns to normal. The convening subscriber places the next call, and repeats the process until the last participant is called and his telephone connected into the conference.

The foregoing description speaks of the originate port as performing the holding function when the convening party disconnects to call the next participant. As indicated at 160, 161, and elsewhere, the attendant also has the ability to so hold and control the conference circuit.

If it is necessary to connect a trunk circuit (91, for example) into the conference call, the connection is made from the line port 77 which appears at the point X6, the line side of the network. To hold the path through the network, it is necessary to apply a holding potential of one polarity on one side of the network. Therefore, the line port 77 (FIG. 3) is shown as having bias circuits with opposite polarities, as compared with the ports 73 and 74. This way, the conference circuit 70 is connected to trunk 91 over a path including line port 77, and access points X6 and Y1. Otherwise, all port circuits function in the same manner.

While the principles of the invention have been described above in connection with specific apparatus and applications, it is to be understood that this description is made only by way of example and not as a limitation on the scope of the invention.

We claim:

1. In a telephone switching system, the combination comprising conference call circuit means having a plurality of access port circuits, means comprising at least one voice path associated with each of said port circuits for selectively controlling a private conversation path and a common conversation path, means for initially interconnecting a convening party and each participant party in a sequence via said private conversation path, means for thereafter transferring said participant party to said common conference path, wherein said controlling means comprises a pair of mixing busses and voice gates means for selectively connecting each of said port circuits to either of said mixing busses, and wherein each of said voice gate means comprises a diode having biasing means connected thereto on either side thereof and means selectively back biasing one of said diodes while forward biasing the other of said diodes.

2. The switching system of claim 1 and means wherein said transferring means is controlled by a hook-switch flash.

3. A conference call circuit having means for sequentially introducing a plurality of subscriber lines into a common speech channel, means for initially interconnecting at least two of said subscriber lines in a private speech channel before said introduction into said common speech channel, means for thereafter transferring said two subscribers from said private speech channel to said common speech channel and means for operating said conference call circuit to set up a "meet-me" conference call.

4. The conference call circuit of claim 3 and attendant control means, and means for setting up a conference call from said attendant control means.

5. The conference call circuit of claim 4 and means for connecting a trunk circuit to said conference call circuit, and means for thereafter selectively releasing said trunk circuit without releasing either said conference call circuit or other subscriber lines interconnected in said conference call.

6. A telephone switching system comprising a plurality of conference control circuits, each such circuit individually associatable with a party participating in a conference to provide supervisory signals to the party so associated, one of said circuits responsive to a party convening a conference for controlling the completing of the connection to a called party over a private conversation path to said called party, means in the associated control circuits for transferring said convening and called party to a common conference path simultaneously, means in the circuit associated with said called party for holding said conference path following release therefrom of said convening party to allow said convening party to add other parties to said conference, each successive other party being connected individually to said convening party over said private conversation path for subsequent transfer to said common conference path.

7. A system as claimed in claim 6, wherein said transferring means is controlled by a flashing of the hook switch by the convening party.

* * * * *